US008441145B2

(12) United States Patent
Gestri (10) Patent No.: US 8,441,145 B2
(45) Date of Patent: May 14, 2013

(54) MODULAR POWER DISTRIBUTION SYSTEM TO DRIVE DC AND AC ELECTRICAL LOADS, IN PARTICULAR FOR VEHICLE OR DOMOTICS APPLICATION

(75) Inventor: Marco Gestri, Castelnuovo Rangone (IT)

(73) Assignee: Mahtechs S.r.L., Milan (IT)

( * ) Notice: Subject to any disclaimer, the term of this patent is extended or adjusted under 35 U.S.C. 154(b) by 273 days.

(21) Appl. No.: 12/734,245

(22) PCT Filed: Oct. 22, 2008

(86) PCT No.: PCT/EP2008/064271
§ 371 (c)(1),
(2), (4) Date: Apr. 20, 2010

(87) PCT Pub. No.: WO2009/053384
PCT Pub. Date: Apr. 30, 2009

(65) Prior Publication Data
US 2010/0308653 A1      Dec. 9, 2010

(30) Foreign Application Priority Data
Oct. 22, 2007   (IT) .............................. PR2007A0079

(51) Int. Cl.
*H02J 4/00*          (2006.01)
(52) U.S. Cl.
USPC ......................................................... 307/26
(58) Field of Classification Search ..................... 307/26
See application file for complete search history.

(56) References Cited

U.S. PATENT DOCUMENTS

| 6,201,319 | B1 | 3/2001 | Simonelli et al. |
| 6,856,045 | B1 | 2/2005 | Beneditz et al. |
| 7,251,723 | B2 * | 7/2007 | Lam .................................. 713/1 |
| 7,634,329 | B2 * | 12/2009 | Liu et al. ........................ 700/292 |
| 7,860,582 | B2 * | 12/2010 | Ghercioiu et al. ................. 700/1 |
| 2002/0108065 | A1 | 8/2002 | Mares |
| 2003/0016520 | A1 | 1/2003 | Cooney et al. |
| 2006/0101296 | A1 | 5/2006 | Mares et al. |
| 2007/0271403 | A1 | 11/2007 | Kojori |
| 2008/0100140 | A1 * | 5/2008 | Sorenson et al. ............... 307/40 |

OTHER PUBLICATIONS

Paul M. Anderson and James A. Martin; "Automated Power Distribution System Hardware"; Martin Marietta Astronautica Group; 1989; 3 pages.
National Aeronautics and Space Administration; "Automated Power-Distribution System"; Feb. 1991; p. 128.
National Aeronautics and Space Administration; "Automated Power-Distribution System"; Jul. 1992; p. 483.

* cited by examiner

*Primary Examiner* — Adi Amrany
(74) *Attorney, Agent, or Firm* — Stetina Brunda Garred & Brucker (57) ABSTRACT

A modular power distribution system configured to drive DC and AC electrical loads comprises logical units in different locations receiving DC and AC power lines for distribution to respectively DC and AC electrical loads in all of these locations. In each of the logical units, the system comprises one or more physical units, and in each of the physical units one or more power modules for the distribution of DC or AC power to one of the DC or AC electrical loads. Finally, the system comprises at least one master control unit for each of the logical units placed in one of physical units to control the functions of the pertaining logical unit.

8 Claims, 9 Drawing Sheets

MODULAR POWER DISTRIBUTION SYSTEM TO DRIVE DC AND AC ELECTRICAL LOADS, IN PARTICULAR FOR VEHICLE OR DOMOTICS APPLICATION

FIELD OF THE INVENTION

The present invention relates to a modular power distribution system to drive DC and AC electrical loads, in particular for vehicle or domotics application.

DESCRIPTION OF THE PRIOR ART

The power distribution systems known in the art are not optimized for some specific needs, where both AC and DC currents must be distributed, with different voltage levels, in a number of different locations within the same environment. It is difficult to configure the power distribution according to different specific needs, and perform a distribution as close as possible to the loads.

SUMMARY OF THE INVENTION

Therefore it is the main object of the present invention to provide a modular power distribution system to drive DC and AC electrical loads, in particular for vehicle or domotics application, which solves the above mentioned problems.

The purpose of the invention is to propose a self-configurable unit able to operate in electromechanical recovering. The unit is completely modular, comprising a base containing a first part of electromechanics, which can be combined with one or more modules, or blocks for the control of loads and of the entire unit, comprising an electronic part and a further electromechanical part. In such a way the unit becomes completely configurable depending on the number of user units or loads to be controlled.

It is an object of the present invention a modular power distribution system to drive DC and AC electrical loads, comprising:
- one or more logical units in independent locations, receiving DC and AC power lines for distribution to respectively DC and AC electrical loads in all of said independent locations;
- one or more physical units, in each of said logical units, each of said physical units controlling and distributing DC or AC power to respectively one or more of said DC or AC electrical loads in one of said independent locations;
- one or more power modules in each of said one or more physical units, for specific distribution of DC or AC power to one of said DC or AC electrical loads;
- at least one master control unit for each of said one or more logical units said master control unit being placed in one of said physical units, to control the functions of the pertaining logical unit.

These and further objects are achieved by means of a modular power distribution system to drive DC and AC electrical loads, in particular for vehicle or domotics application, as described in the attached claims, which are considered an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numbers and letters in the figures designate the same or functionally equivalent parts.

DETAILED DESCRIPTION OF THE PREFERRED EMBODIMENT

Figure 1:
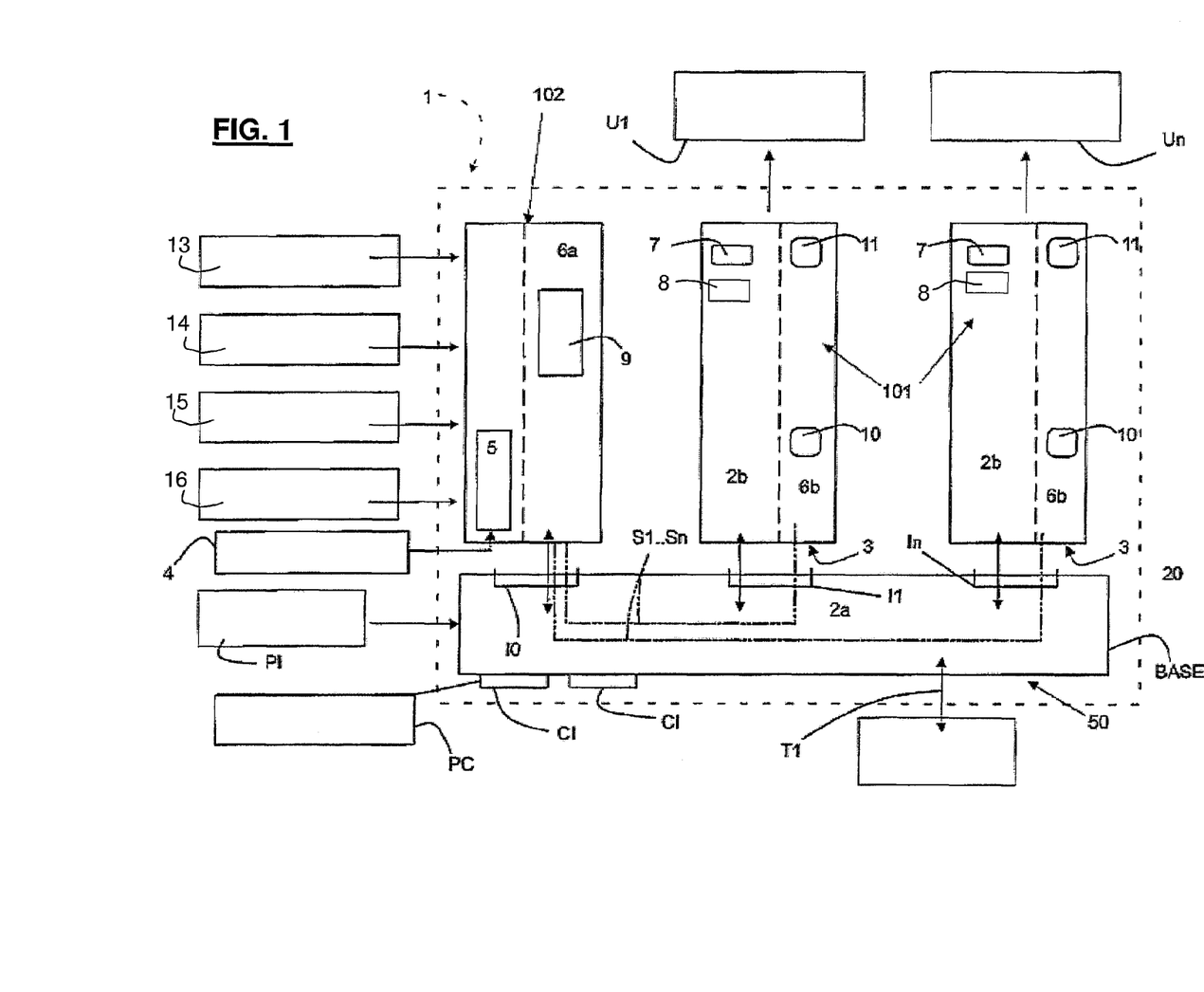
FIG. 1 shows a block diagram of a phisical unit PHU of the system in accordance with the invention.

With reference to FIG. 1, an electronic and electromechanical redundancy physical unit 1 is shown for the control of electric loads of various kinds. The unit 1 comprises an electromechanical part 2a, 2b, and an electronic part 5, 6a, 6h, both parts divided among the various components, in particular:
- a first electromechanical part 2a is placed on a supporting BASE 50 of the unit 1;
- a second electromechanical part 2b is placed on one or more modules 101 for the control of different user units or loads U1, . . . Un.

Also the electronic part is divided inside the unit 1 and in particular is divided among:
- a control block 102 of the entire unit 1, including a first section 5 switched on at any time, connected to the priority digital inputs 4, and a second section 6a able to send signals S1, . . . Sn to relating blocks 101 connected to the unit 1;
- modules or blocks 101 for the control of the various user units or loads U1, . . . Un, including also the electromechanical part 2b.

The unit 1 comprises the base 50 and at least a control block 102 of the entire unit 1, and one or more modules or blocks 101 for the control of the loads U1, . . . Un.

The unit 1 becomes this way configurable depending on the number of user units or loads U1, . . . Un to be controlled, and may also become an elementary unit of the power distribution system according to the invention.

The electromechanical part 2a of the base 50 comprises, in addition to the ports 10, 11, . . . In for the connection with the blocks 101 and 102, all the power PI and communication CI inputs, and the expansion and communication outputs to be connected with other units 1, for a complete modularity of the load control system, increasing this way the number of user units or loads to be controlled. For the connection among the expansion and communication units each group is provided with suitable terminal connector T1 for the input and output connections.

The electromechanical part 2b inserted in each block 101 comprises thermal switches 7 and extractable fuses 8, as many as the number of users served by each module 101. The function of switches 7 is that of disconnecting the electronic part 6b of the corresponding module 101, giving the possibility of the manual switching ON/OFF, while the function of fuses 8 is to switch off the electronic part in case of breaking of the inserted connection.

In addition, on each block 101 the following blocks are present:

Led 10 able to show the correct status of activation of the load, both due to the by-pass switch 7, and to the electronics;

Led 11 for each power electronic output to show the ON/OFF status of the load.

The blocks 101 of a single unit 1 are selected to satisfy the specific needs of load control (U1 . . . Un); in fact from the choice of the block 101 depends a different functionality.

The loads (U1 . . . Un) are controlled by suitable modules 101 in AC and/or DC current.

In addition each user (U1 . . . Un) can be controlled in ON/OFF or in PWM (pulse wide modulation) for the intensity regulation.

The number of blocks 101 corresponds to the number of loads and functions to be controlled; also the same unit can be modular with other similar units 1.

In addition to the blocks 101, further blocks can also be connected, like the following:

An emergency module for the control of the main connections to the main power 110/220VAC;

A module for the connection of the system to an Ethernet network;

A module for the remote monitoring, so as to know status, bad functions and statistics, and to give assistance; or to dial a set of telephone numbers to inform about dangerous events and alarms;

A module for the control of switching relays;

A module for the control of a DC motor;

A module for the control of a stepper motor;

A module for safety control able to deny the access and/or the functions to non authorized people;

A wireless module for the control of users in different rooms, by remote control, reducing the need of wires;

A module for registering data able to store old parameters and events which happen in the vehicle for and easier failure analysis.

The base 50 as to be connected to at least a block 102 for the complete control of the modular unit 1.

The block 102 in the single unit 1 can be redundant for increasing security.

The block 102 comprises the configuration of all the modules 101 and controls their compete functionality, as for example the highest current value at the output of the connected module 101, the activation curves the min and max current thresholds, the number of switching on attempts in case of fault.

In addiction module 102 allows storing of the active status so as to allow the recovering of the initial conditions also in case of power drop.

The section 5 is at low power, and in case of receiving a priority signal 4, activates the section 6a and/or 6b of the corresponding module 101, which can be set up for self switching off, if the conditions of the users (U1 . . . Un) remain constant for a given time interval.

The communication ports CI share data necessary for organizing the functioning logics inside the inserted modules.

The data necessary for setting up of the functioning logics, come directly to the block 102 from analog inputs 13, and/or digital ON/OFF inputs 14, digital frequency inputs 15, and indirectly from remote devices 16, like keyboards, through communication ports BUS for the exchange of data, to the base 50 or control module 102.

Each communication port can be doubled for redundancy and reliability purposes.

In the following an example of embodiment of the invention will be described, as applied in a vehicle, specifically a Power Boat.

The following acronyms with their relating meaning will be used in the description and in the drawings:
AC=Alternate Current
BBD=Baseboard Module
CAN=Controlled Area Network (known standard communication bus)
CAN1=CAN line n.1
CAN2=CAN line n.2
DC=Direct Current
EXP=BBD Expansion Port
GND=Ground (Reference of Battery Voltage)
In =Load Nominal Current
ISB=Internal Signals Bus
L=Line Phase (in the AC)
LED=Light Emitting Diode
LOG=Standard or Error Event logged
LOU=Logical Unit
LUN=LUO Identification Number inside the PBS
MAC=AC Load Power Module
MAL=PHU Power Supply Module
MBC=LOU Controller Module
MDC=DC Load Power Module
MDU=Dummy Module N-Neutral (in the AC)
PBS=PowerBox System
PC=Personal Computer
PE=Protection Earth (in the AC)
PCB=Printed Circuit Board
PHU=physical Unit
PUN=PHU Identification Number inside the PHU
SETUP=File containing all information useful to the execution of all possible functionality of the unit and of its slave units
VBAT=Battery Voltage With reference to FIGS. 2, 3 and 4 it is shown a modular intelligent PowerBox System PBS based on a number of common baseboards, as applied to the vehicle. Baseboards are able to accept, connect and recognize all modules able to provide each, specific functions.

A complete PowerBox System PBS can be organized in order to drive both AC and DC electric loads.

In the vehicle, two main Power Lines, one for DC and one for AC, and two Communication Lines are enough to share the intelligent information and distribute the electrical power.

A complete PowerBox System comprises a distributed group, i.e. from 0 to 255, of Logical Units LOU of PowerBoxes.

Each Logical Unit can include from 1 to 4 physical Units PHU.

One physical Unit can drive DC electrical loads or AC electrical loads. It is not allowed from certification safety rules that one physical unit drives both AC And DC electrical loads.

With the above safety restriction, the physical Unit can be DC-load oriented or AC-load oriented.

However, one Power Box Logical Unit can include a mixture of DC and AC physical Units.

A physical Unit comprises the following elements:
Baseboard BBD: one BBD is necessary for a physical unit;
Logic Power Module MAL: one MAL is necessary for physical unit:
Control Unit (Master Module) MBC: at least one MBC is necessary for a Logic unit;
DC lower Module MDC: at least one MDC is necessary to drive electrical DC loads in case of DC physical Unit;
AC Power Module MAC: at least one MAC is necessary to drive electrical AC loads in case of AC physical Unit;

In a LOU there will be at least one master module MBC and all other modules connected (MDC, MAC, . . . ) will be slave modules.

All PHUs of one LOU, can be controlled even from one only control module MBC. To realize this operativity, it is necessary to establish the communication link of the Expansion Port EXP of each Baseboard BBD with the others of the same LOU. To establish the communication between the several LOUs composing the total PBS inside the vehicle, the CAN1 and CAN2 ports of all BBDs where MBCs are installed, have to be linked.

Figure 2:
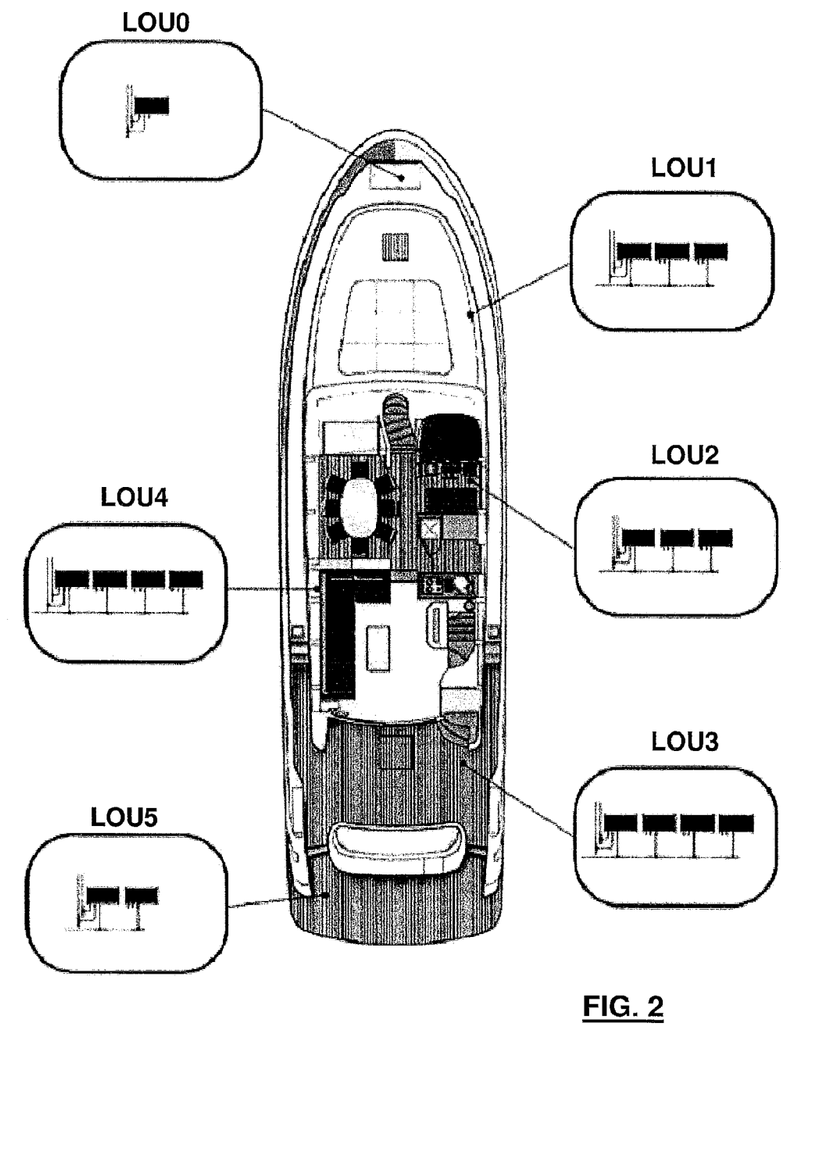
FIGS. 2 and 3 show schematic diagrams of an example of embodiment of the system of the invention, as applied in a power boat.
Figure 3:
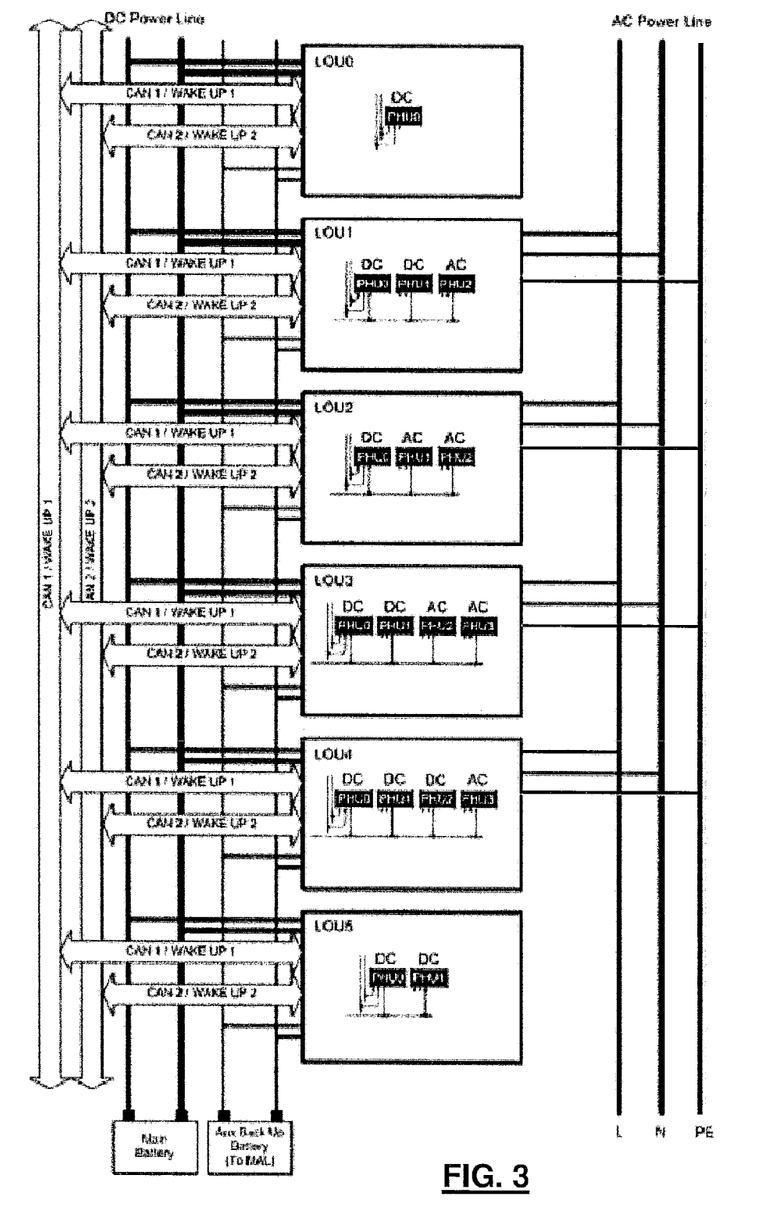

FIGS. 2 and 3 show and example of a Power Boat with a PBS. The system shown has six LOUs and a total of seventeen PHUs. Each first PHU of each LOU is equipped with the MBC and has a CAN communication ports linked In FIG. 4 it is shown a physical layout of the baseboard BBD of a PHU for DC application: in this non limiting example the baseboard BBD can host one MAL, one MBC, and four MDCs.

Figure 4:
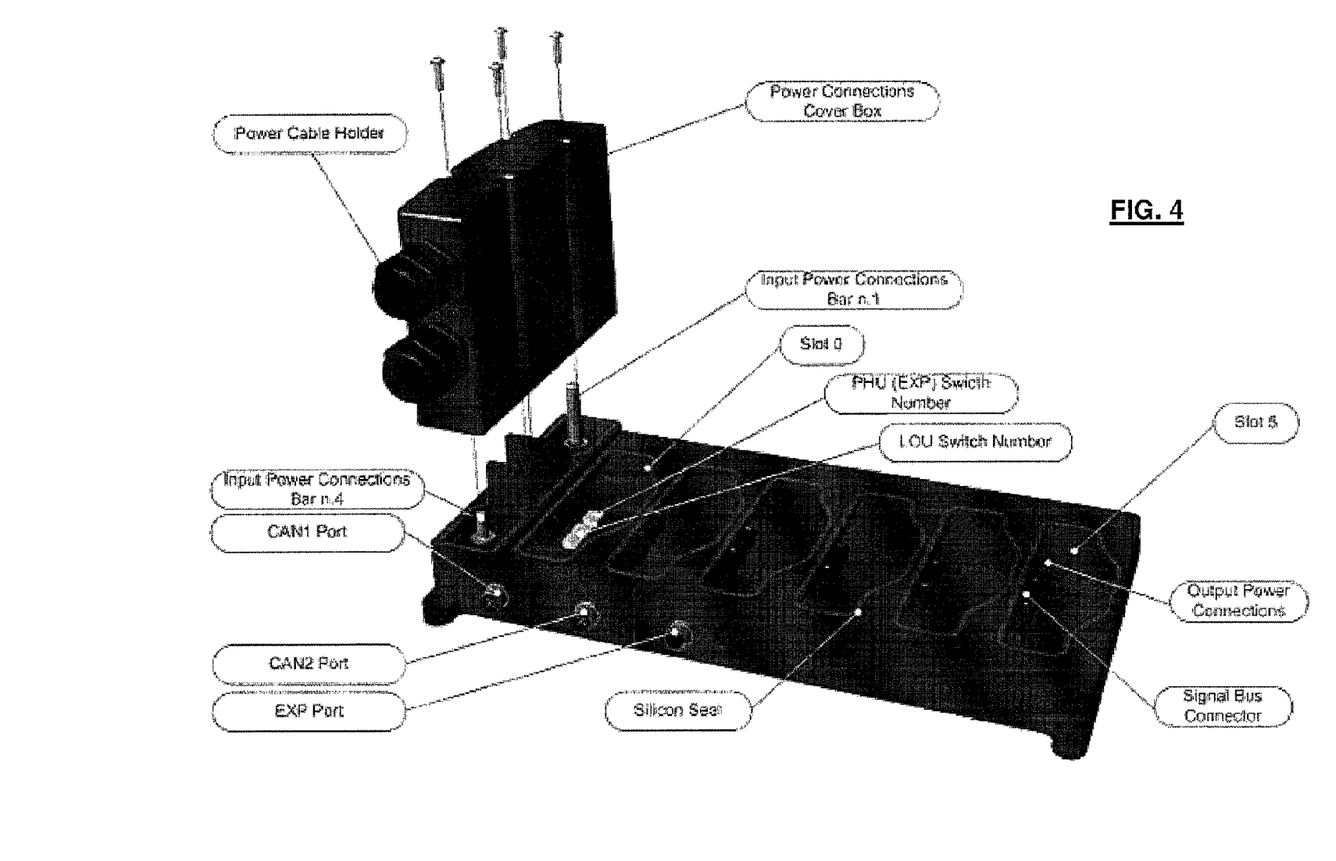
FIG. 4 shows a picture of an elementary phisical unit PHU of the system.

The Baseboard BBD it is the support device to build a PHU. It performs the following functions at least:
  Lock the modules of the PHU;
  Accept the input of the Electrical Power Supply;
  Cover and Protect the Power Inputs connections;
  Distribute the Electrical Power to all modules of the PHU;
  Distribute and share the Internal Signals Bus ISB between the modules connected to the PHU;
  Supply the port EXP to expand the ISB to other PHU Baseboards of the same LOU;
  Supply the ports for CAN1 and CAN2 communications BUS;
  Host the Switch to set the Logical Unit Number LUN;
  Host the Switch to set the physical Unit Number PUN (it can be from 0 to 3).

The Baseboard has six free slots (0 to 5) where six modules can be locked. Slot 0 is dedicated to the MAL module.

In the first PHU of the LOU, the slot 1 is usually for the MBC device, while in the other PHUs of the LOU can be used for a MDC or MAC module.

The case of the BBD is a plastic glass reinforced molding case. It is able to guarantee a IP65 protection, when slots are occupied with modules.

The power is supplied to the modules via gold plated copper bars.

Figure 5:
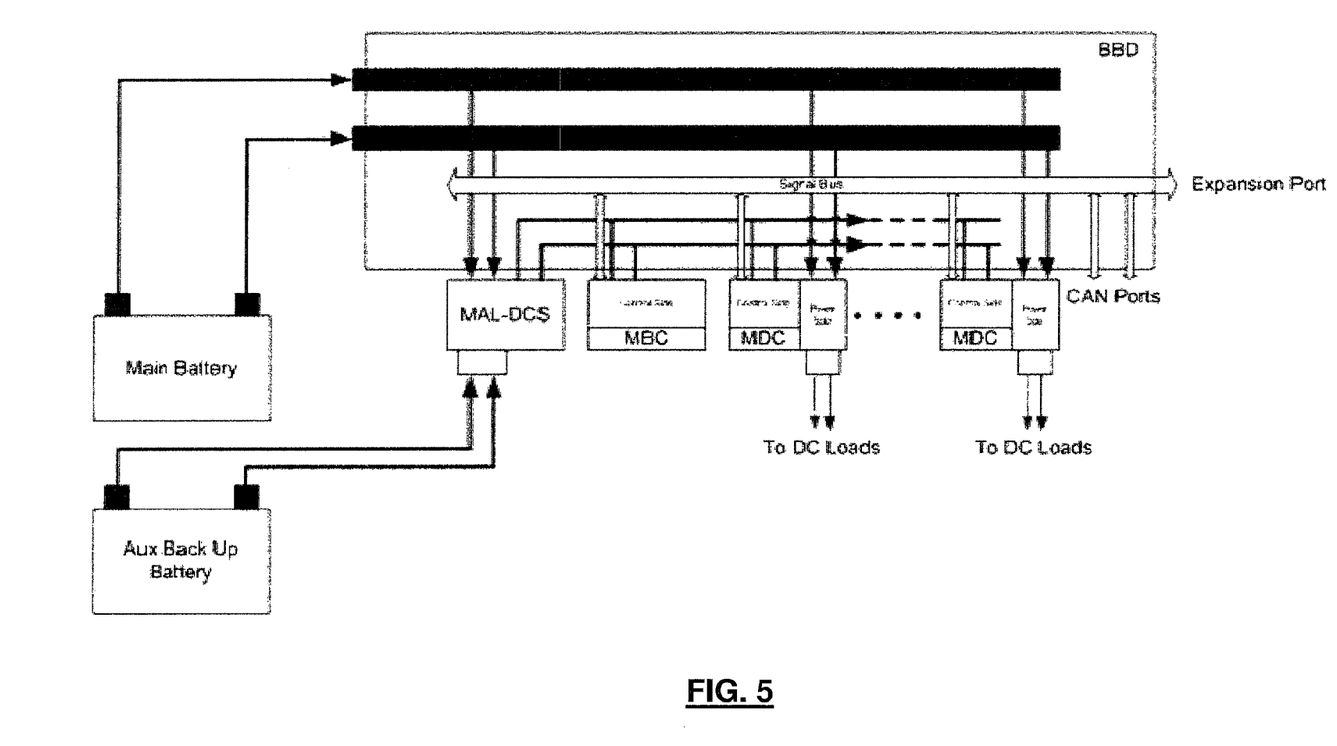
FIGS. 5 and 6 show schematic circuit diagrams of a phisical unit PHU, respectively in case of DC and AC current distribution.
Figure 6:
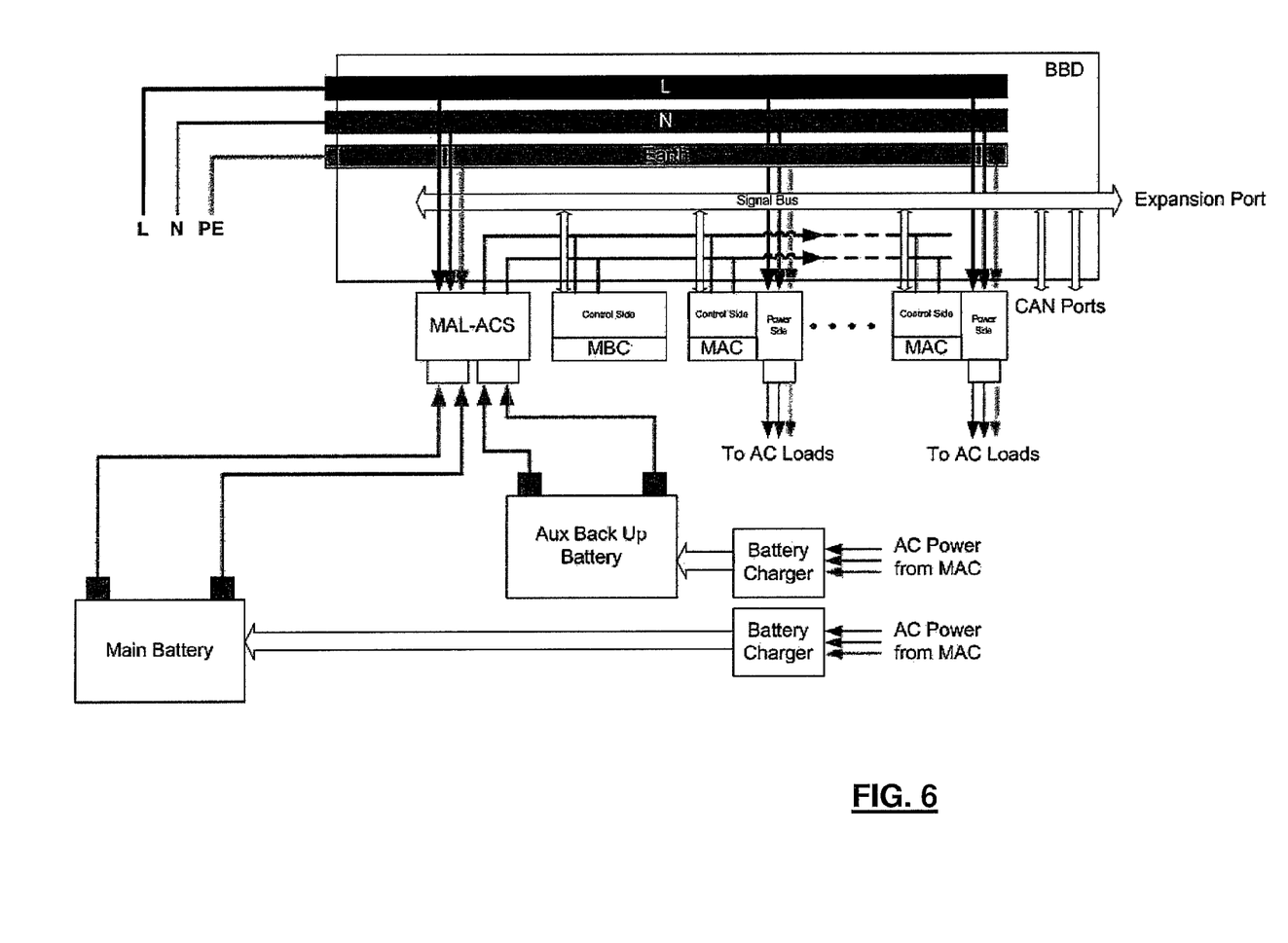

FIGS. 5 and 6 show the typical organization of a PHU for DC and AC application respectively.

The Power Supply Module MAL is in the Control Side of each other module used for the PHU.

Instead of integrating the power supply in each module, it has been preferred this choice in order to meet any kind of electrical requirement of the vehicle and the highest reliability of control and monitoring:

This choice because of several factors:
First of all, any electronic control circuit is powered from DC power source. So, even for AC Power Modules MAC, the internal power to supply the circuit has to be a DC voltage.

If in the AC Power Modules the DC power is obtained from AC, in case of AC power missing, not only the main AC power is lost, but also the full control of the system and the related information necessary to have a good monitoring. So, in order to not have this problem a good DC power source for the control circuitry has not to be exclusively obtained from AC.

The first solution, simple but not failproof, is to use the Main DC battery present in the vehicle also to supply the power of the control side of the modules.

The second solution is able to guarantee the functionality even with one DC battery is flat. If a second DC battery power input is provided (Back Up Aux Battery) there are two battery source ready to power the control side, keeping the highest safety and reliability To meet these requirements, two MAL modules have been developed:
  MAL-DCs for DC PHU, having two DC sources:
  The first from the Power bars inside the baseboard
  The second available from another DC battery via an external connector.
  MAL-ACs for AC PHU having two external sources via two external connectors, and one internal source from the AC power bars: this because in case of flat DC sources (battery) an AC PHU can activate battery recharger units in order to get the full operativity. (FIG. 6).

Figure 7:
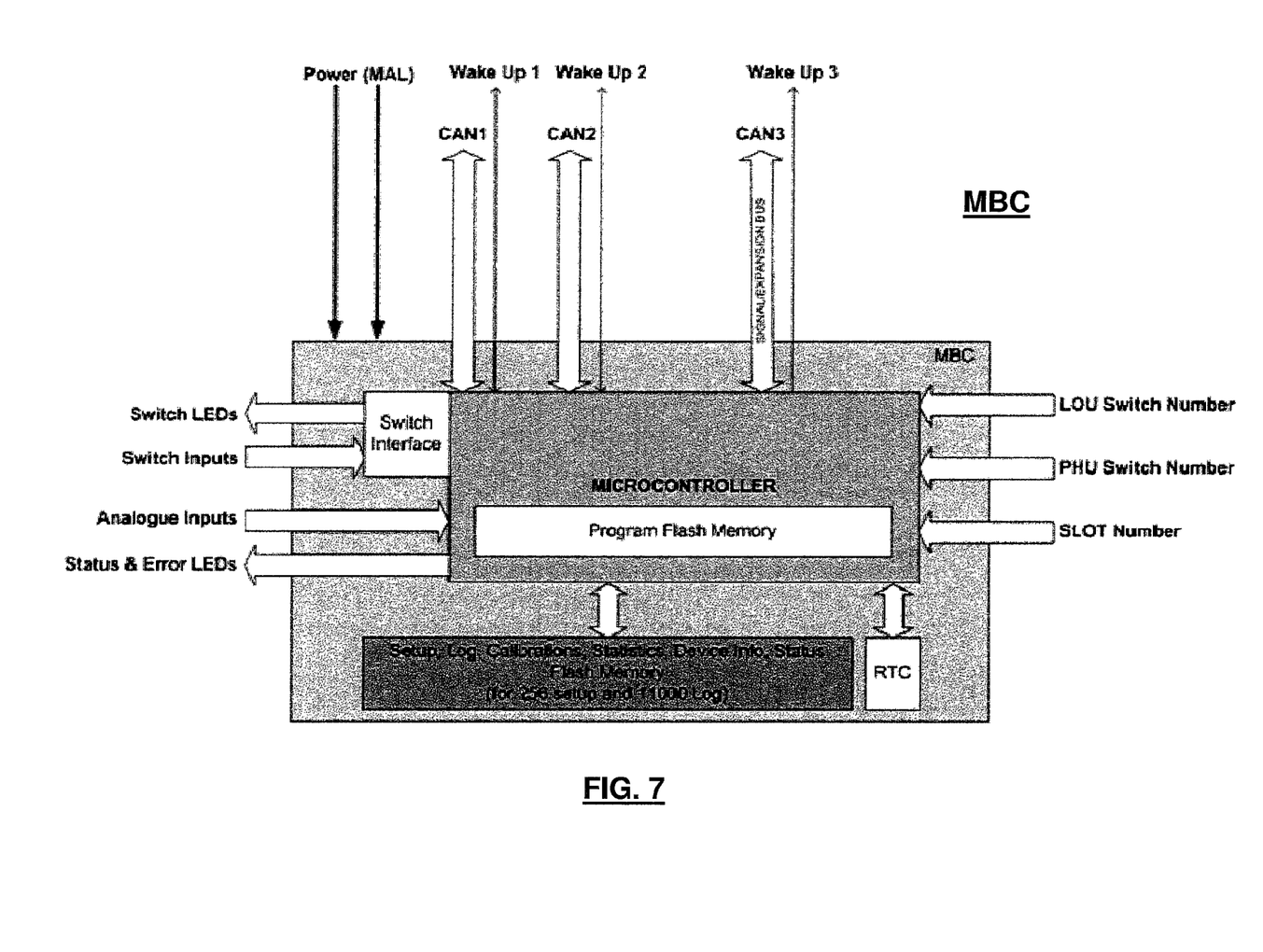
FIGS. 7, 8 and 9 show schematic circuit diagrams of circuit blocks MBC, MDC, MAC respectively, present in a phisical unit.

With reference to FIG. 7, The LOU Controller MBC is the module able to perform all activities necessary to control the functionality of each single module included in the LOU and to execute the communication link with all other LOUs and devices connected on the CAN Buses.

The functionality (configuration and control logic) of the MBC and of all modules of the LOU, can be configurable via a PC Software.

The configuration and the control logic created with the PC application software, generates a setup file to download in the MBC memory via a CAN (CAN1 or CAN2) connection.

To perform all calculations and drive properly all modules installed into the same LOU, MBC comprises a microcontroller unit which will use all data coming from:
  Direct analogue and digital inputs;
  CAN1 bus, CAN2 bus in reciprocal software configurable redundancy;
  Internal Expansion Bus CAN3;
  Date and Time from its own Real Time Clock RTC.

MBC has the following direct transducers inputs:
  Switch Digital Inputs;
  Software configurable Analogue Inputs (for example 4-20 mA, 0-32VDC, 0-200 mV, 0-250Ω);
  PT100 Temperature Input;
  Battery Voltage output to drive the transducers.

For a quick visible feedback, MBC is also equipped with LEDs:
The MBC is powered from the MAL module, and the internal RTC has its own battery.

The MBC has two different memories:
  A Program Flash memory fully dedicated to the software program only;
  An huge Auxiliary Flash memory used to store data: for example device information as: Part Number, Serial Number, Date of Test, Internal Software Version, Access Passwords.

Other important signals for the MBC are the Wake Up lines.

Each Wake Up is joined to the related CAN bus.

Wake Up 1 & 2 can be received or transmitted and Wake Up 3 can be transmitted only. This because CAN1 & 2 are involving all others MBCs of the complete PBS and CAN3 is exclusive for the modules owns from the LOU where MBC is the main controller.

This feature is because it is possible to put an MBC or some modules of a LOU in SLEEP mode; this mode can be a condition of the programmed logic functionality (setup) and it can also be enabled via a CAN1 &2 message from another external MBC.

To resume a SLEEPed module, it will be necessary for the MBC of the same LOU, to change the status of the Wake Up 3 line.

In case an MBC receives one only Wake Up signal (Wake Up 1 or Wake Up 2 only and not Wake Up 1 and Wake Up 2)

with Redundancy Active, MBC will be Waked Up, but a Redundant Error Check will be activated.

As Wake Up lines, also the Input Switches can be configured.

As far as the MBC Functionality is concerned, when powered on, MBC is reading from the BBD configuration switches, the following numbers: LOU Number, PHU Number, SLOT Number.

This will enable the MBC to identify where it is installed and to bootstrap with the related setup (because each setup inside its memory is identified by a SETUP NUMBER). This feature is very important because will enable the vehicle manufacturer to have one item only in stock for all applications, getting a very simple management of the MBC configuration.

In case the MBC module has an empty setup memory (this means NO SETUP stored in its flash memory), it will communicate the SETUP missing status in Broadcast to all other MBCs of the system. This will enable the downloading of the SETUP from one of the other working MBCs (with SETUPs) of the system. This can be a common event when the replacement of one MBC unit failed is necessary: the replacement will be an easy operation able to be performed by any people even without a PC equipment.

Once started, the MBC will request the identification of the modules connected in each SLOT of the BBD; the modules present will answer sending its identifications data and the setup identifier:

if SLOT occupied, module type and setup identifier will be the same as in the setup stored, the MBC will enable the operation.

In case a different setup is found, a new setup will be sent to the module.

In case a different module type or an empty SLOT is detected, the SLOT will be disabled and an error will be activated In a LOG memory an internal LOG file will record special events like: Power On/Off; Sleep; Wake Up; Setup Download; Remote Connection; CAN Failure; Redundant Wake Up Failure; Internal Failure; Low/High Power; Low/High Temperature; Input Failure; Low RTC battery; Remote Connection ON/OFF; SLOT Empty; Module Mismatching or Wrong Setup; Password Changed, etc. . . .

The LOG memory is able to keep recorded up to 9000 records, with Date, Time, event description. The LOG file can be downloaded to remote device as PC or server.

Also up to 2000 user defined LOGs can be recorded.

MBC will send control information via CAN3 to the same LOU modules, to activate the desired status of the electrical loads connected. MBC will also receive from each module all internal values useful to all other devices of the PBS. In this case, MBC will also work as gateway turning on CAN1&2$i$ the information useful to be share with others LOU of PBS.

Figure 8:
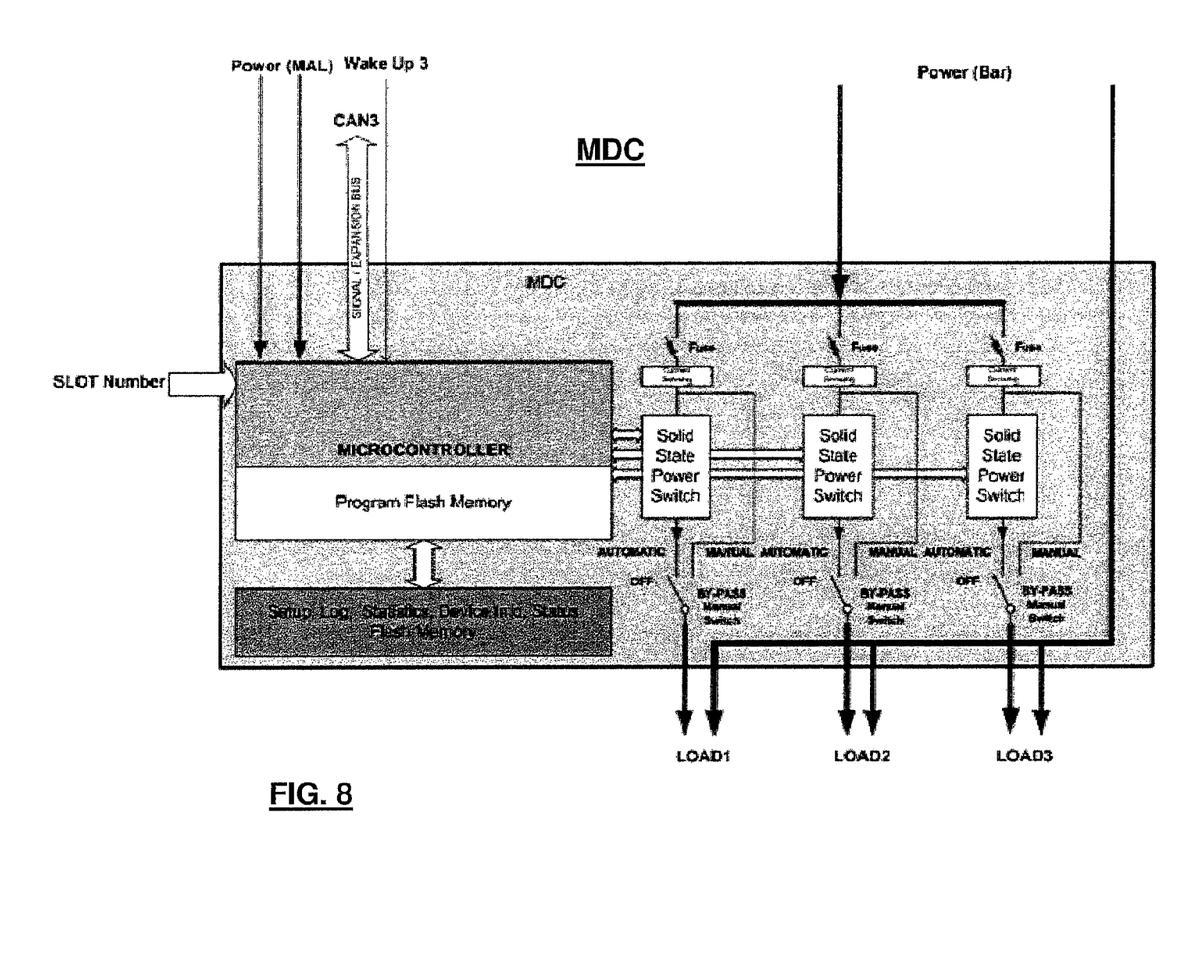

In case of Power Down and in case the MBC and all modules will stop to be operating, when powered again the last load status recorded will be presented. With reference to FIG. 8, the MDC module is the module dedicated to power DC electrical loads, i.e. up to 20 Amps each as nominal current for a total of 50 A nominal maximum.

The MDC module comprises a microcontroller unit performing the control of the operations of the module.

The MDC module can be used in the PBS as driven from MBC or in the stand alone version without the control of an external controller MBC.

When powered on, the MDC module reads the SLOT number and communicates to the LOU MBC the own data and setup:

When setup and acknowledgment is received from MBC, MDC will start to be operating, cycling sending the operational data via CAN3 back to MBC.

In case no answer from MBC will be received, the device will stay in NOT

Operating Mode.

If MDC will loose the communication with MBC during operating, it will move to the Safe Mode and will continue to work with the setup present.

Each power line (each load line) is equipped with its own Safety Replaceable Fuse, and a solid state power switch controlled by the microcontroller unit.

In addition each power line (each load line) is equipped with a By-Pass manual Switch to be able to: get OFF the power line; Drive the load in manual (forcing on); Drive the load automatically (from the system).

In the MDC three types of fuses can be used: Blade Automotive; Thermal Blade Automotive; Glass (Time Lag type) 6,3x32

By Pass Manual Switch positions will force different MDC functionality:

When OFF is activated, the load is powered OFF.

When Manual is activated, the fuse is the only protection present.

When Automatic is activated the module is able to drive the load activating the following automatic protections: Short Circuit, Open Load, Out of Range Current.

When Automatic operation is activated, the device will measure Outputs currents; Voltages in some important points of the circuit, Internal temperatures.

During Automatic operation, the following conditions can be found:

In case of Short Circuit founded, the MDC has to manage the RETRY strategy, disconnecting the load instantaneously and re-connecting again the load after the software programmed time delay. After the number limit of RETRYs from setup, load will be disconnected and a fault message will be sent to the MBC In case of OPEN LOAD condition, the power will be shut off and a fault message will be sent to the MBC In case of OUT of RANGE current, the load will continue to be powered but a fault message will be sent to the MBC In case the communication is lost with MBC, Safe Mode condition will be activated.

In this case the MDC will perform the following operations:

Keep the ON/OFF/PWM status;

Manage the output status followings the current and the curve defined;

In case of short circuit, manage the RETRY strategy;

In case of OPEN LOAD, shut off the power;

In case of OUT of RANGE no action will be taken from MDC.

Figure 9:
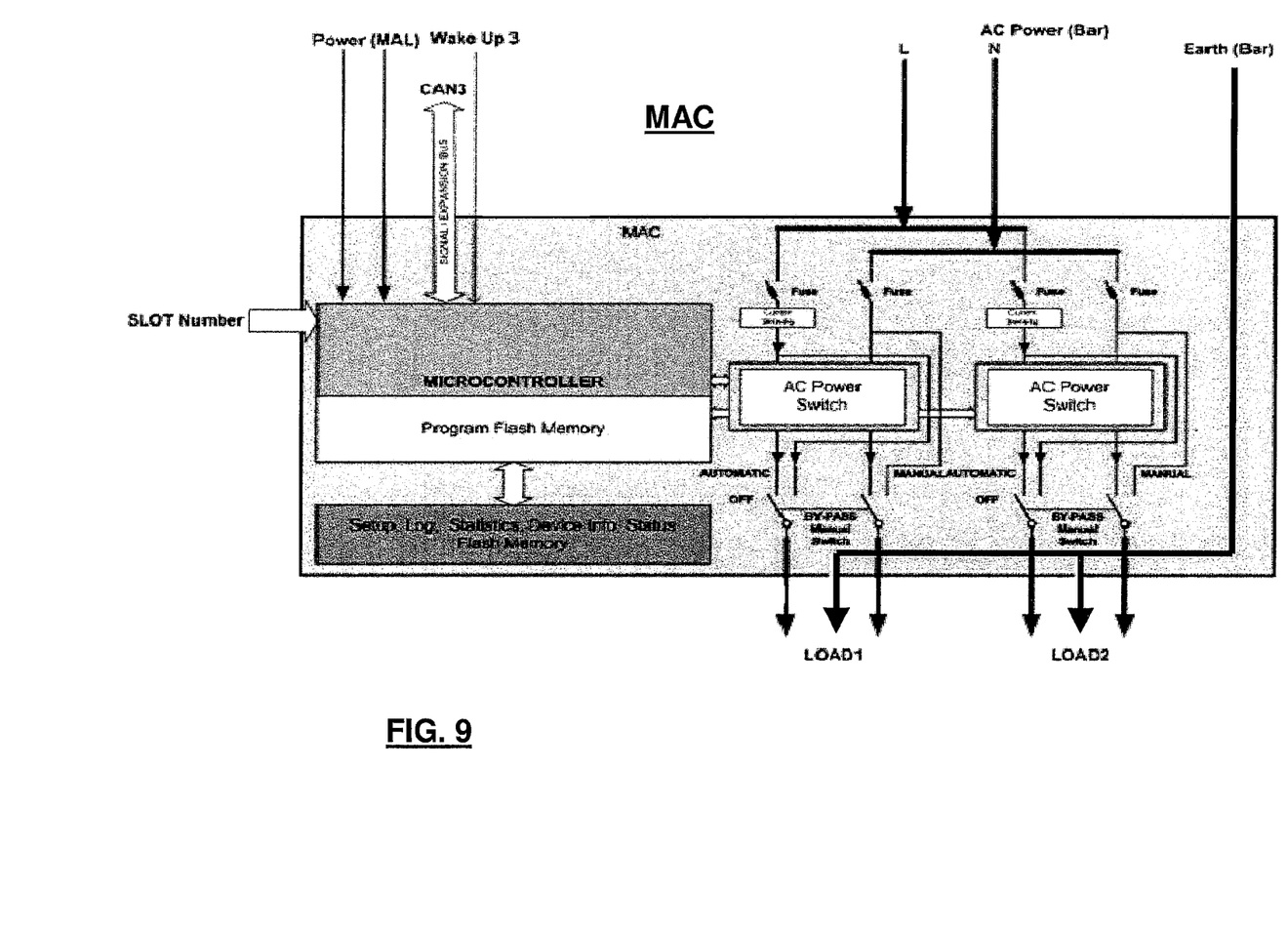

With reference to FIG. 9, the MAC module is the equivalent module of MDC but for AC Electrical Loads.

MAC is able to drive AC electrical loads, i.e. for max 16 A nominal current each, for a max total of 32 A.

Normally, AC Power can be 110VAC to 220VAC nominal, 50-60 Hz.

The MAC module comprises a microcontroller unit performing the control of the operations of the module. The actions and the controls performed are the same as MDC.

Both Phase and Neutral are managed and interrupted for safety reasons

As for MDC, also in MAC module By-Pass Switches are integrated.

The above described modules are the core modules of the PBS. The several LOUs and PHUs can be equipped with additional modules to increase the functionalities of the full system and the integration with other electronic devices on board and with remote servers.

Other modules can be the following:

LCD Display: as a Human Interface Device to show all PBS operational parameters and status and accept commands to drive loads and remote switches.

GATEWAY Module: to operate as Gateway between CAN1 & CAN2 of the PBS with:

GPS-GPRS-IRIDIUM Module: is a module with integrated GPS and a

GSM/IRIDIUM radio communication devices able to establish a remote communication with a SUPPORT CENTER SERVER By means of the present invention, a number of advantages are achieved.

Instead of a multiple PLCs wired with relay blocks present in conventional electric junction box, the invention shows a modular intelligent system based on a common baseboard.

A first advantage is the full modularity of the system, because the system can be configured according to specific needs.

It is possible to distribute the system close to the electrical loads: this reduces cable size, weight, loss of energy and get the system more compact and easy to service.

Full reliability is obtained due to the possibility to have integrated by pass switch to be able to operate always in manual mode: even with a complete electronic failure the mechanical switches are able to guarantee the mechanical connection of the electricity with the standard fuse protection.

The electrical system usage is optimized, and the cost reduction is obtained due to the reduction of the energy used.

A further simplification and cost reduction is obtained during the installation of the system, and in the remote support.

Further implementation details will not be described, as the man skilled in the art is able to carry out the invention starting from the teaching of the above description.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

The invention claimed is:

1. A modular power distribution system to drive DC and AC electrical loads, comprising:
one or more logical units in independent locations, receiving DC and AC power lines for distribution to respectively DC and AC electrical loads in all of said independent locations;
one or more physical units, in each of said logical units, each of said physical units controlling and distributing DC or AC power to respectively one or more of said DC or AC electrical loads in one of said independent locations;
one or more power modules in each of said one or more physical units, for distribution of DC or AC power to one of said DC or AC electrical loads, wherein each of said power modules for DC power comprises for each power line for said DC electrical loads at least a safety replaceable fuse, a solid state power switch and a by-pass manual switch;
at least one master control unit for each of said one or more logical units, said master control unit being placed in one of said physical units, to control the functions of the pertaining logical unit
wherein each of said physical units further comprises a power supply module, which logically controls the power distribution to the inputs of all the power modules in the pertaining physical unit and each of said power modules for DC or AC power comprises a control unit exchanging control data with the pertaining master control unit and
wherein the by-pass manual switch causes an OFF, a manual and an automatic functionalities of the power module such that:
when the OFF functionality is activated, the load is powered off;
when the manual functionality is activated, the safety replaceable fuse is the only protection electrically connected to the current supply path; and
when the automatic functionality is activated, the by-pass manual switch is moved to include the solid state power switch in the current supply path and the power module measures output currents, voltages and internal temperatures such that the power module is able to drive the loads activating an automatic protection in case of a short circuit, an open load and/or an out of range current, based on the measured output currents, voltages and internal temperatures.

2. A modular power distribution system as in claim 1, wherein each of said physical units comprises a supporting baseboard, having a number of physical slots to host the pertaining master control unit, power supply module, and one or more power modules, each of said physical slots being assigned a SLOT number.

3. A modular power distribution system as in claim 2, wherein said supporting baseboard comprises means for performing the following functions:
locking modules of the physical unit, these modules including the one or more power modules, the power supply module and the at least one master control unit;
accepting the inputs of an electrical power supply through power inputs interconnections;
covering and protecting the power inputs connections;
distributing electrical power to the modules of the physical unit;
distributing and sharing an internal signals bus between the modules connected to the physical unit;
supplying a further port to expand the internal signals bus to other baseboards of the physical units of the same logical unit;
supplying ports for communications BUS of the CAN type;
hosting a switch to set a Logical Unit Number;
hosting a switch to set a Physical Unit Number;
hosting a switch to set said SLOT number.

4. A modular power distribution system as in claim 3, wherein said master control unit comprises means for reading from the relating supporting baseboard said SLOT number, Logical Unit Number, and Physical Unit Number, so as to identify where it is installed and determine a related setup, the related setae being identified by a setup number.

5. A modular power distribution system as in claim 4, wherein, in case said related setup is missing, said master control unit communicates a SETUP missing status to all other master control units of the system, so as to enable the downloading of another setup from one of said other master control units.

6. A modular power distribution system as in claim 4, wherein said master control unit comprises means for requesting, at the start up, the SLOT number, Logical Number and Physical Unit Number of the modules connected to each of said slots of the relating supporting baseboard, and for performing the following operations:
- if a slot is occupied, and if the module type and setup number are the same as in the setup stored, the master control unit enables the operation of the module;
- in case a different setup is found, a new setup is sent to the module;
- in case a different module type or slot not occupied by any module is detected, said slot is disabled and an error procedure is activated.

7. A modular power distribution system as in claim 3, wherein exchanging control data between the control unit of said power modules for DC or AC power and the pertaining, master control unit, includes reading the slot number, and own data and setup, so as to perform the following operations;
- when setup and acknowledgement is received from the master control unit, the power module starts operating, cycling sending operational data back to the master control unit;
- in case no answer from the master control unit is received, the power module stays in NOT Operating Mode;
- if the power module looses the communication with the master control unit, it moves to a Safe Mode, continuing with the current setup.

8. A modular power distribution system as in claim 1, wherein said safety replaceable fuse is of one of the following kinds: blade automotive thermal blade automotive; glass.

* * * * *